Jan. 15, 1963　　　　H. W. COLLINS　　　　3,072,958
METHOD AND APPARATUS FOR MAKING REINFORCED PLASTIC
Filed April 21, 1959　　　　　　　　　　　　2 Sheets-Sheet 1
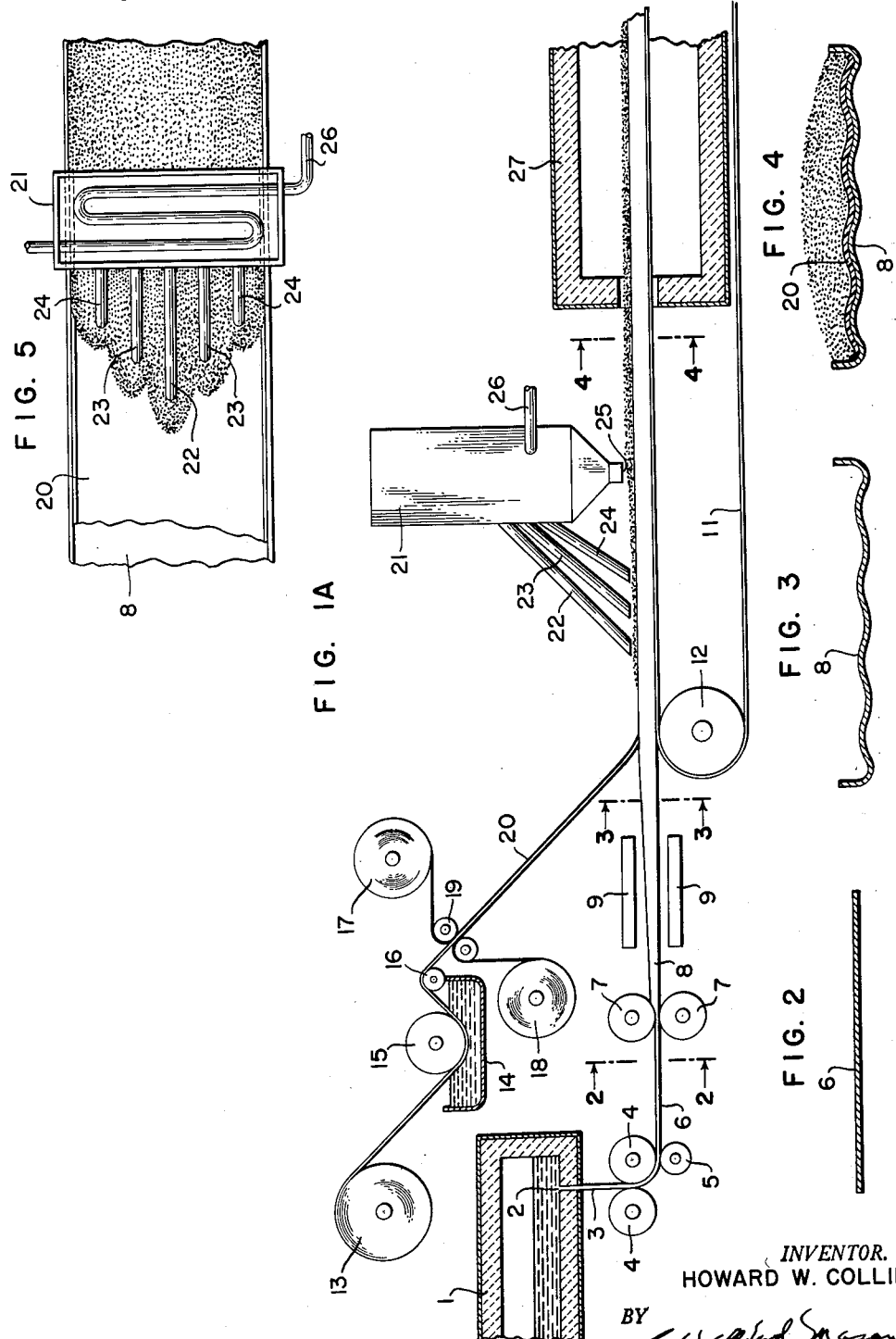
INVENTOR.
HOWARD W. COLLINS
BY
ATTORNEY.

Jan. 15, 1963   H. W. COLLINS   3,072,958
METHOD AND APPARATUS FOR MAKING REINFORCED PLASTIC
Filed April 21, 1959   2 Sheets-Sheet 2
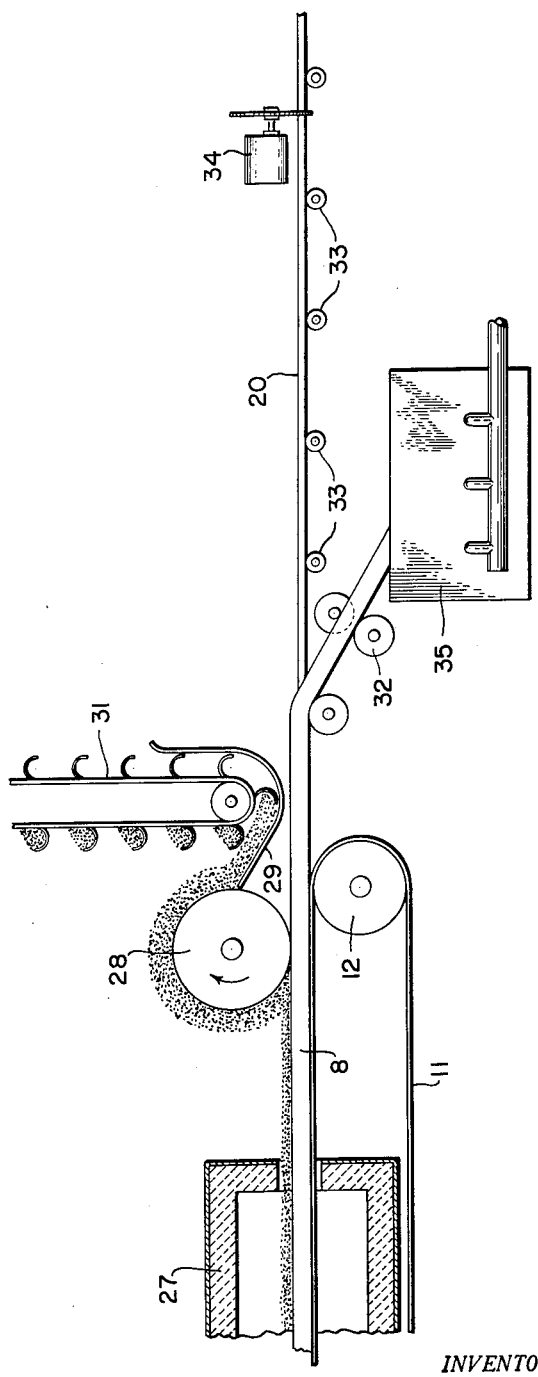
FIG. IB
INVENTOR.
HOWARD W. COLLINS
BY
ATTORNEY.

3,072,958
METHOD AND APPARATUS FOR MAKING REINFORCED PLASTIC

Howard W. Collins, Hebron, Ohio, assignor to Collins & Company, Dresher, Pa., a partnership
Filed Apr. 21, 1959, Ser. No. 807,878
6 Claims. (Cl. 18—4)

The present invention relates to the manufacture of reinforced plastic panels used for structural purposes, and more particularly to a method and apparatus for manufacturing said panels of a thermo-setting material.

At the present time panels of the type with which this invention is concerned are made in individual sheets, stacked and cured. If the panels are corrugated, matched corrugated metal plates are placed between each panel as they are stacked to give them the proper curves prior to curing them. After curing, the panels must be unstacked and trimmed to size.

It is an object of the present invention to provide a method and apparatus for the continuous manufacture of structural panels of reinforced plastic of the thermo-setting type.

It is a further object of the invention to provide for the continuous molding and curing of a web of reinforced plastic material which can then be cut into lengths of the desired size.

Another object of the invention is to provide a novel mold for sheet material and a novel means of forcing the material into the contour of the mold.

In practicing the invention, a continuous metal mold is cast, shaped to the desired contour and moved through a path. While the mold is traveling through the path a web off reinforced plastic material is laid on the mold, shaped to conform to the contours thereof, and carried through an oven to be cured. The cured web is then cut to the desired lengths for panels or sheets and the mold is melted for reuse.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIGS. 1a and 1b show diagrammatically the apparatus used for forming the applicant's panels, FIG. 2 is a view taken on line 2—2 of FIG. 1a, FIG. 3 is a view taken on line 3—3 of FIG. 1a, FIG. 4 is a view taken on line 4—4 of FIG. 1a, and FIG. 5 is a plan view of a portion of the apparatus used in carrying out the applicant's invention.

In practicing the invention a continuous metal mold is provided for receiving the panel forming material, and carrying this material until such time as it is cured. To form the mold there is provided a metal melting furnace 1 having a discharge opening in the form of an elongated slot 2 through which a thin stream of metal 3 is discharged between a pair of chilled rollers 4. Thus, there is continually cast a sheet of metal of which the mold is to be formed. Since, as will be pointed out below, the temperatures involved in the curing of the panels are relatively low, the metal of the mold may be a lead base type of metal which has a melting point in the neighborhood of 490 F. This kind of metal will freeze at a temperature of approximately 460 F. so that the metal can be frozen into a sheet continuously by the rollers 4 as it is discharged from the furnace. The sheet of metal which is now indicated at 6 is guided by roll 5 into a horizontal path through which it continues during the entire operation of the apparatus.

After the sheet 6 is formed, and while it is still soft enough to be bent, it passes between a pair of forming rollers 7 which shape it to the desired contour as indicated at 8. As shown in FIG. 3, the mold is corrugated so that conventional sheets or panels such as those used for roofing and structural purposes can be formed. The mold is also provided with vertically extending flanges at its edges. The mold passes between a pair of chilling plates 9 that are cooled in any convenient manner to reduce the temperature of the mold to approximately 225 F. Beyond these plates the mold is carried by a belt 11 passing over guide rolls 12 through the remainder of its path.

The material of which the panels are formed is preferably a low pressure thermo-setting resin which is non-condensing such as a polyester resin of thalic anhydrate with monomeric styrene which is reinforced with mineral or organic fibers or a combination of both. As shown herein there is provided a supply roll 13 of a web of reinforcing material that may be glass fibers, for example, which passes from the roll through a tank 14, under and over guide rolls 15 and 16, respectively. The tank is filled with the resin in liquid form, and the web of fibers is impregnated by the resin as it moves through the tank. Upon leaving the tank the impregnated web is encased between sheets of cellophane to form a flexible sandwich. The cellophane serves as a mold release, and as a means of excluding air from the impregnated web of fibers as the sandwich is being fed to the mold. The cellophane is supplied from rolls 17 and 18 and passes into engagement with the impregnated web as the latter goes between rolls 19 which serve to press the cellophane against the web, and to squeeze the web to the desired thickness. The sandwich containing the web encased in cellophane is indicated at 20, and is directed to the mold where it is received on the corrugated surface between the flanges. Ordinarily the mold between the flanges will be of a width slightly narrower than the width of the sandwich.

The web of material is forced against the corrugations of the mold and into the contour thereof my means of granular material such as iron shot which is deposited upon the upper surface of the web. To this end there is provided a reservoir 21 of shot of a suitable size which is discharged from spouts 22, 23 and 24. By reference to FIG. 5 it will be seen that the spout 22 is in the center of the web and extends further toward the direction from which the web is moving. Thus, the weight of the shot deposited on the web by this tube will force the center of the web into engagement with the center corrugation of the mold. Tubes 23 next deposit shot upon the web to pull the edges thereof inwardly so that the web can be moved against the corrugations next away from the center. Tubes 24 deposit shot on the web adjacent to the edges thereof. Thus, it will be seen that the method of depositing shot first at the center of the web, and then toward the edges, will move the web into engagement with the corrugations from the center toward the edges so that it will be held against the mold without wrinkles, and by the time the web is forced into each corrugation it will have been narrowed to a width that is substantially equal to the distance between the up-standing edges of the mold. Additional shot to a depth equal to the height of the side flanges of the mold, which may be several inches, as shown in FIG. 4, can be placed on the web by means of a discharge slot 25 at the bottom of container 21. The thickness of the layer of shot is sufficient so that its weight will hold the web securely against the upper surface of the mold while the curing operation takes place. If desired, very fine shot can be used for this purpose, in which case there will be no apparent marking on the surface of the completed panel. If, however, a pebble effect is desired on the surface, larger shot can be used. It is desirable to heat the shot to a temperature slightly below the curing temperature of the web in order to reduce the heat necessary for curing the web, and also to shorten the time that is required for this purpose. To this end, there is shown a coil 26 in container 21 through which steam is circulated to heat the shot before it is discharged onto the web.

The mold with the web and the shot on it is now moved by the belt 11 through an oven 27 that is heated to a temperature sufficient to cure the web. Resins of the type mentioned will set in about one minute at a temperature of about 225 F., the time varying with the thickness. Since the curing is a function of time and temperature, the oven can be forty feet long for a web speed of forty feet per minute so that the web will be cured and rigid by the time it leaves the end of the oven, as shown in FIG. 1b.

As the web leaves the oven it is a rigid continuous body that may be cut to any desired length. Before this can be done, however, the shot must be removed and the web must be separated from the mold. The first of these is accomplished by a magnetic roller 28 located above the web in a position to attract the shot and carry it away from the web. As the roller rotates it moves past a scraper 29 that removes the shot from its surface and permits it to fall into a trough, from which it can be removed by a conveyor 31. It is intended that the conveyor will redeposit the shot in supply container 21 for reuse. Immediately beyond the end of the conveyor 11 the mold is guided downwardly to strip it from the rigid web by a pair of rollers 32. The rigid web, however, continues along its horizontal course over guide rollers 33 to a point where it can be cut into panels or sheets of a suitable length by a saw 34.

When the mold is stripped from the web, it is directed by rollers 32 into a melting furnace 35 where it is remelted. The metal from furnace 35 can be conveyed by ladle or pumped through a suitably insulated pipe back to furnace 1 for reuse. It will also be apparent that the mold can be cut into sections and carried to furnace 1 in solid form for remelting, if this is more convenient than carrying it back to furnace 1 in liquid form.

From the above it will be seen that a metal mold is made continuously, and moved through a horizontal path which extends the entire length required for the forming of the panels that are to be manufactured. The reinforcing material and the plastic are combined and encased and moved into the mold as a continuous web. This web is pressed against the mold so that it will take the configuration thereof, and while so pressed is cured on a continuous basis. Thereafter the cured web is cut into sheets or panels of the desired length. By this invention the applicant has devised a means for making, on a continuous basis, reinforced plastic panels that are suitable for structural purposes. The invention does away with the necessity for forming the panel individually, and does away with the loss that is occasioned by the trimming to size of individual panels.

It will be apparent that the rollers 7 may be so formed that any desired contour of the mold can be obtained, whether it is corrugated with smooth curves, or with corners, or is merely a flat sheet. In addition it will be apparent that the thickness of the web of reinforced material 13, and the spacing of rollers 19, will determine the thickness of the final panels or sheets that are produced.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for forming structural panels comprising an elongated, open mold having a substantially horizontal surface with the desired contour of the panel, means to move said mold through a horizontal path, means to deposit a web of thermo-setting material on said mold at one point in its path, means to deposit a granular material on said web to force it against the surface of said mold, heating means surrounding a portion of the path through which said mold moves while carrying said web and granular material on its horizontal surface, said heating means serving to cure said web, means to remove said granular material from said web, means to separate said cured web from said mold, and means to cut said web into lengths.

2. The combination of claim 1 including means to cast said mold continuously from a metal and supply said mold to said means to move.

3. The combination of claim 1 in which said means to deposit granular material includes means to deposit said granular material progressively from the center to the edges of the web as the web is moving through the path on said mold.

4. Apparatus for forming sheets of thermo-setting material comprising means to form a continuous rigid mold having a substantially horizontal, open surface formed with a desired contour, means to move said mold through a horizontal path, means to place a web of fiber reinforced thermo-setting material on said mold, means to deposit granular material on said web to force it into the configurations of said mold and hold it against said horizontal surface, heating means located along said path beyond said means to deposit to heat said web of material to its setting temperature, means located beyond said heating means to remove the granular material from the web, means to separate the web and mold, and means to cut the web into sheets of a desired size.

5. The method of preparing sheets of thermo-setting material which comprises forming an open mold for the sheets, placing a layer of thermo-setting material on the mold, placing a layer of granular material on the thermo-setting material to force the latter into the configurations of the open mold, heating the mold, the thermo-setting material and the granular material to a temperature sufficient to cure the thermo-setting material while the mold is open, separating the cured thermo-setting material from the granular material and the mold, and cutting the material into sheets.

6. The method of claim 5 in which the mold is formed as a continuous length and is moved through a horizontal path, and in which the various steps are performed continuously at spaced points along said path.

References Cited in the file of this patent

UNITED STATES PATENTS 995,783     Garretson _____ June 20, 1911

(Other references on following page)

UNITED STATES PATENTS

| | | |
|---|---|---|
| 1,327,091 | Egerton | Jan. 6, 1920 |
| 1,450,222 | Pattison | Apr. 3, 1923 |
| 1,622,340 | Paeplow | Mar. 29, 1927 |
| 1,812,686 | Crowdes | June 30, 1931 |
| 2,187,024 | Fowler | Jan. 16, 1940 |
| 2,246,987 | Roos | June 24, 1941 |
| 2,323,191 | Bennett | June 29, 1943 |
| 2,333,143 | Bennett | Nov. 2, 1943 |
| 2,526,945 | Gray | Oct. 24, 1950 |
| 2,538,406 | Allen | Jan. 16, 1951 |
| 2,695,423 | Pardee et al. | Nov. 30, 1954 |
| 2,710,043 | Hubmeier | June 7, 1955 |
| 2,724,216 | Cisne | Nov. 22, 1955 |
| 2,782,458 | Emmert et al. | Feb. 26, 1957 |
| 2,784,763 | Shorts | Mar. 12, 1957 |
| 2,817,875 | Harris et al. | Dec. 31, 1957 |
| 2,949,639 | Woodward | Aug. 23, 1960 |
| 2,965,018 | Jerothe | Dec. 20, 1960 |

FOREIGN PATENTS

| | | |
|---|---|---|
| 401,276 | Great Britain | Nov. 6, 1933 |
| 671,832 | Great Britain | May 14, 1952 |